United States Patent [19]
Antonellis et al.

[11] Patent Number: 5,908,157
[45] Date of Patent: Jun. 1, 1999

[54] PORTABLE CONTROL SYSTEM FOR USE WITH CONVENTIONAL SPRINKLERS

[76] Inventors: Domenico Antonellis, 10 Brund Ln., Dix Hills, N.Y. 11746; George Valentino, 2667 Rockaway Ave., Oceanside, N.Y. 11572

[21] Appl. No.: 08/954,192

[22] Filed: Oct. 20, 1997

Related U.S. Application Data

[63] Continuation-in-part of application No. 08/607,283, Feb. 26, 1996, abandoned.

[51] Int. Cl.$^6$ ................................................ A01G 25/00
[52] U.S. Cl. .............................. 239/70; 239/64; 239/65; 239/67; 239/310; 137/624.2
[58] Field of Search .............................. 137/78.2, 624.2, 137/343; 239/63, 64, 65, 67, 69, 70, 71, 310, 316, 318

[56] References Cited

U.S. PATENT DOCUMENTS

| | | | |
|---|---|---|---|
| 3,370,571 | 2/1968 | Knapp | 239/310 X |
| 3,500,844 | 3/1970 | Sanner | 239/63 X |
| 4,613,764 | 9/1986 | Lobato | 137/78.2 X |
| 4,807,664 | 2/1989 | Wilson et al. | 239/69 X |
| 4,834,143 | 5/1989 | Bayat | 239/69 X |
| 5,207,354 | 5/1993 | Hsu et al. | 137/624.2 X |
| 5,364,030 | 11/1994 | Murdock et al. | 239/310 |
| 5,730,364 | 3/1998 | Gertie | 239/310 X |
| 5,779,154 | 7/1998 | Martin | 239/310 X |

*Primary Examiner*—Andres Kashnikow
*Assistant Examiner*—Robin O. Evans

[57] ABSTRACT

A portable control system for use with conventional sprinklers including a portable housing. Further included is a plurality of interconnections positioned within the housing for allowing interconnection between an inflow hose and a plurality of outflow hoses. A plurality of valves is connected to the interconnection for allowing the passage of fluid upon the activation thereof. A control panel is situated within the housing and connected to the valves. The control panel is connected to a rain level detector and is adapted to allow selective actuation and deactivation of each valve mechanism at a designated time as a function of the amount of rain received by the rain level detector. A fertilizer mechanism is connected to the interconnections for allowing the supply of fertilizer to the fluid passing between the garden inflow hose and the garden outflow hoses. The fertilizer mechanism includes a plurality of containers each connected between the garden inflow hose and an associated one of the garden outflow hoses. This allows the supply of a predetermined amount and type of fertilizer to each of a plurality of discrete sprinklers.

2 Claims, 4 Drawing Sheets

PORTABLE CONTROL SYSTEM FOR USE WITH CONVENTIONAL SPRINKLERS

RELATED APPLICATIONS

The present application is a continuation-in-part of an application filed Feb. 26, 1996 under Ser. No. 08/607,283 now abandoned.

FIELD OF THE INVENTION

The present invention relates to a portable control system for use with conventional sprinklers and more particularly pertains to allowing portable control of a plurality of above the ground sprinklers which may be easily expanded and also used to dispense fertilizer.

DESCRIPTION OF THE PRIOR ART

The use of sprinkler control systems is known in the prior art. More specifically, sprinkler control systems heretofore devised and utilized for the purpose of controlling a sprinkler system are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 3,912,167 to Simon a water distribution head having a timer operated valve. U.S. Pat. No. 5,135,168 to Wang discloses a controller for operating a multi-sprinkler application, wherein the controller has a means for coupling to a conventional garden hose. U.S. Pat. No. 4,061,893 to Sanner discloses sprinkler flow control systems having a continuous cycle timer and associated apparatus disposed in a hermetically sealed housing. U.S. Pat. Nos. 4,708,264 to Bruninga; 4,858,827 to Fletcher et al.; and 4,014,050 to Goldsworthy are provided as being of general interest.

Further patents of interest include U.S. Pat. Nos. 4,957,134; 4,898,202; 4,750,512; 3,845,902; 4,957,134; 5,549,248; 4,099,267; and U.S. Pat. No. Des. 260,116.

Most home owners do not have the funds to have an in the ground sprinkler system to water their lawn. They normally attach one end of a hose to a water spigot and the other end to a sprinkler. Any one who has employed such a system realizes that there are many disadvantages. Namely, (1) they must constantly move the sprinkler from one location on the lawn to another to insure that the entire lawn is watered (2) it becomes a time consuming task and must therefore allocate enough time in their schedule to do so (3) when going on a vacation they must impose on a friend or neighbor to tend to the watering of their lawn while they are away (4) they must fertilize, add chemicals to control insects and disease which often attacks their lawn. This requires additional time to spread the fertilizer and chemicals and often too much fertilizer can result in burnt gras and at other times too little results in a pale green color rather than a lush green healthy lawn.

In this respect, the portable control system for use with conventional sprinklers according to the present invention substantially departs from the conventional concepts and designs of the prior art, and in so doing provides an apparatus primarily developed for the purpose of allowing portable control of a plurality of above the ground sprinklers which may be easily expanded and also used to dispense fertilizer.

Therefore, it can be appreciated that there exists a continuing need for a new and improved portable control system for use with conventional sprinklers that can be used for allowing portable control of a plurality of above the ground sprinklers which may be easily expanded and also used to dispense fertilizer. In this regard, the present invention substantially fulfills this need.

SUMMARY OF THE INVENTION

In view of the foregoing disadvantages inherent in the known types of sprinkler control systems now present in the prior art, the present invention provides an improved portable control system for use with conventional sprinklers. As such, the general purpose of the present invention, which will be described subsequently in greater detail, is to provide a new and improved portable control system for use with conventional sprinklers apparatus and method which have all the advantages of the prior art and none of the disadvantages.

To attain this, the present invention essentially comprises a portable housing with a base having a bottom end, open top end, front face, rear face, and pair of side faces defining an interior space. The base further has a plurality of apertures formed in the bottom end thereof for allowing the drainage of fluid. A lid is hingably coupled to the base and has an upper surface with a handle coupled thereto. For coupling purposes, a plurality of cylindrical male couples is included. Each male couple comprises an axial bore formed therein, a threadedly lined outer surface, and an intermediate section having a hexagonal cross-section. Each male couple also has a first end adapted to releasably couple to a conventional garden hose. Positioned within the housing is a plurality of interconnections. Each interconnection comprises a T-shaped conduit with a pair of open axially aligned ends and an orthogonal end. The T-shaped conduits are each coupled at the orthogonal end thereof to a solenoidal valve at a first end thereof. The solenoidal valves are adapted to allow the passage of fluid upon the receipt of an activation signal. The valves are further adapted to preclude the passage of fluid therethrough upon the absence of such activation signal. Each interconnection employs one of the male couples to align a second end of the valve with one of a plurality of apertures formed in the front face of the housing. Such male couple also allows coupling with an outflow hose. One of the interconnections employs one of the male couples to align one of the axial ends of the T-shaped conduit thereof with an aperture formed in the side face of the housing. Such interconnection also allows coupling with an inflow hose. The remaining interconnections are interconnected at the axial ends thereof using a plurality of male couples. Also included is a rain level detector attached to the upper surface of the lid. The rain level detector is adapted to measure the amount of rain and to deploy a deactivation signal upon the measuring of a designated amount. Finally, a control box comprising a control panel is situated on the lower surface of the lid. A lid is hingably coupled thereto for precluding water from penetrating therein. The control panel is connected to the rain level detector and each solenoidal valve of the interconnections. During use, the control panel is adapted to allow selective transmission of the activation signal to each solenoidal valve at a designated time. The panel may also be utilized to allow selective adjustment of the duration of such transmission for each solenoidal valve. To prevent over watering of the lawn, the panel is further adapted to preclude the transmission of the activation signal upon the receipt of the deactivation signal from the rain level detector.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable control system for use with conventional sprinklers which has all the advantages of the prior art sprinkler control systems and none of the disadvantages.

It is another object of the present invention to provide a new and improved portable control system for use with conventional sprinklers which may be easily and efficiently manufactured and marketed.

It is a further object of the present invention to provide a new and improved portable control system for use with conventional sprinklers which is of a durable and reliable construction.

An even further object of the present invention is to provide a new and improved portable control system for use with conventional sprinklers which is susceptible of a low cost of manufacture with regard to both materials and labor, and which accordingly is then susceptible of low prices of sale to the consuming public, thereby making such portable control system for use with conventional sprinklers economically available to the buying public.

Still yet another object of the present invention is to provide a new and improved portable control system for use with conventional sprinklers which provides in the apparatuses and methods of the prior art some of the advantages thereof, while simultaneously overcoming some of the disadvantages normally associated therewith.

Still another object of the present invention is to allow portable control of a plurality of above the ground sprinklers which may be easily expanded and also used to dispense fertilizer.

Lastly, it is an object of the present invention to provide a new and improved portable control system for use with conventional sprinklers including a portable housing. Further included is a plurality of interconnections positioned within the housing for allowing interconnection between an inflow hose and a plurality of outflow hoses. A plurality of valves is connected to the interconnections for allowing the passage of fluid upon the activation thereof. A control panel is situated within the housing and connected to the valves. The control panel is connected to a rain level detector and is adapted to allow selective actuation and deactivation of each valve mechanism at a designated time as a function of the amount of rain received by the rain level detector. A fertilizer mechanism is connected to the interconnections for allowing the supply of fertilizer to the fluid passing between the garden inflow hose and the garden outflow hoses. The fertilizer mechanism includes a plurality of containers each connected between the garden inflow hose and an associated one of the garden outflow hoses. This allows the supply of a predetermined amount and type of fertilizer to each of a plurality of discrete sprinklers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
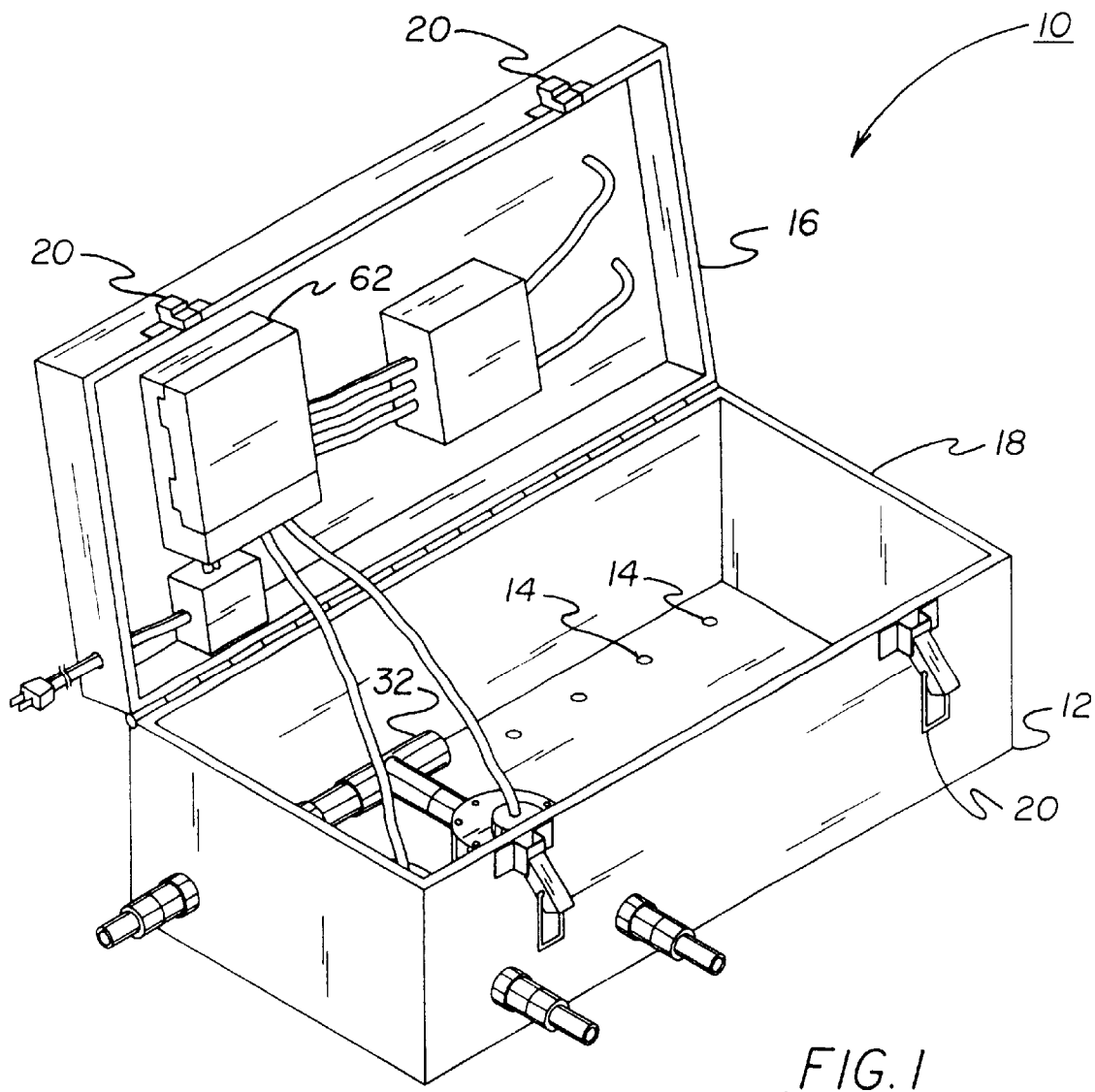
FIG. 1 is a perspective illustration of the preferred embodiment of the portable control system for use with conventional sprinklers constructed in accordance with the principles of the present invention.
Figure 2:
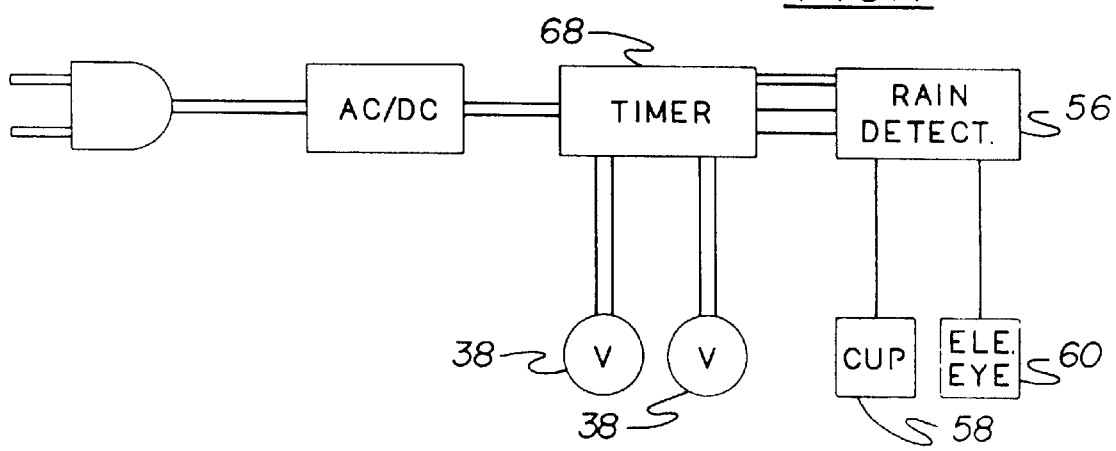
FIG. 2 is a schematic depicting the interconnection of the timer, rain level detector, and associated valves employed in the present invention.
Figure 3:
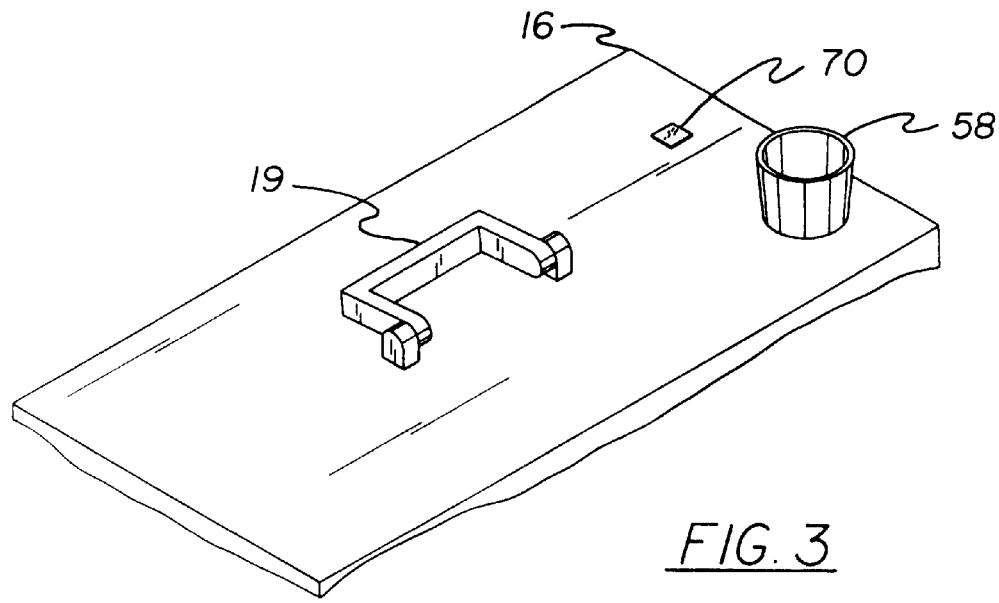
FIG. 3 is a perspective view showing the lid of the housing and the rain cup coupled thereto.
Figure 4:
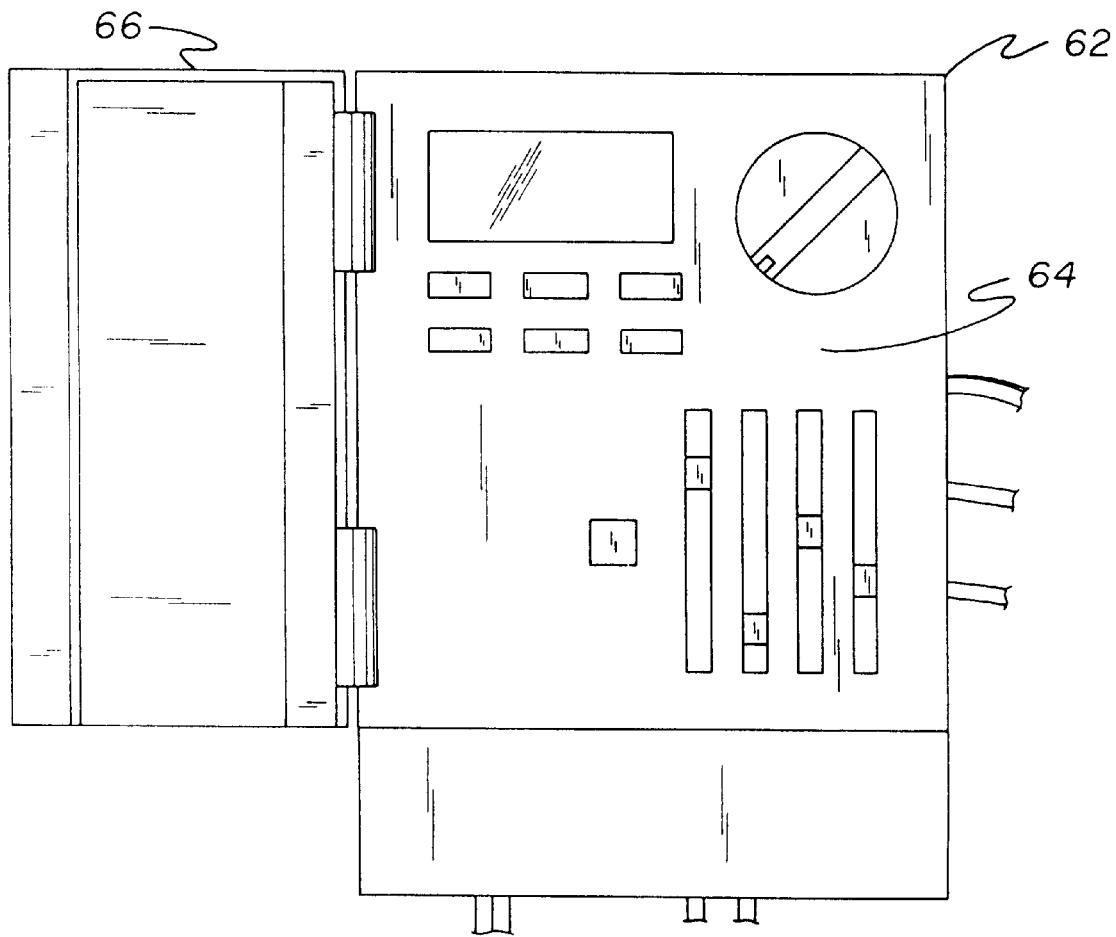
FIG. 4 is a front plan view depicting the control panel of the present invention.
Figure 5:
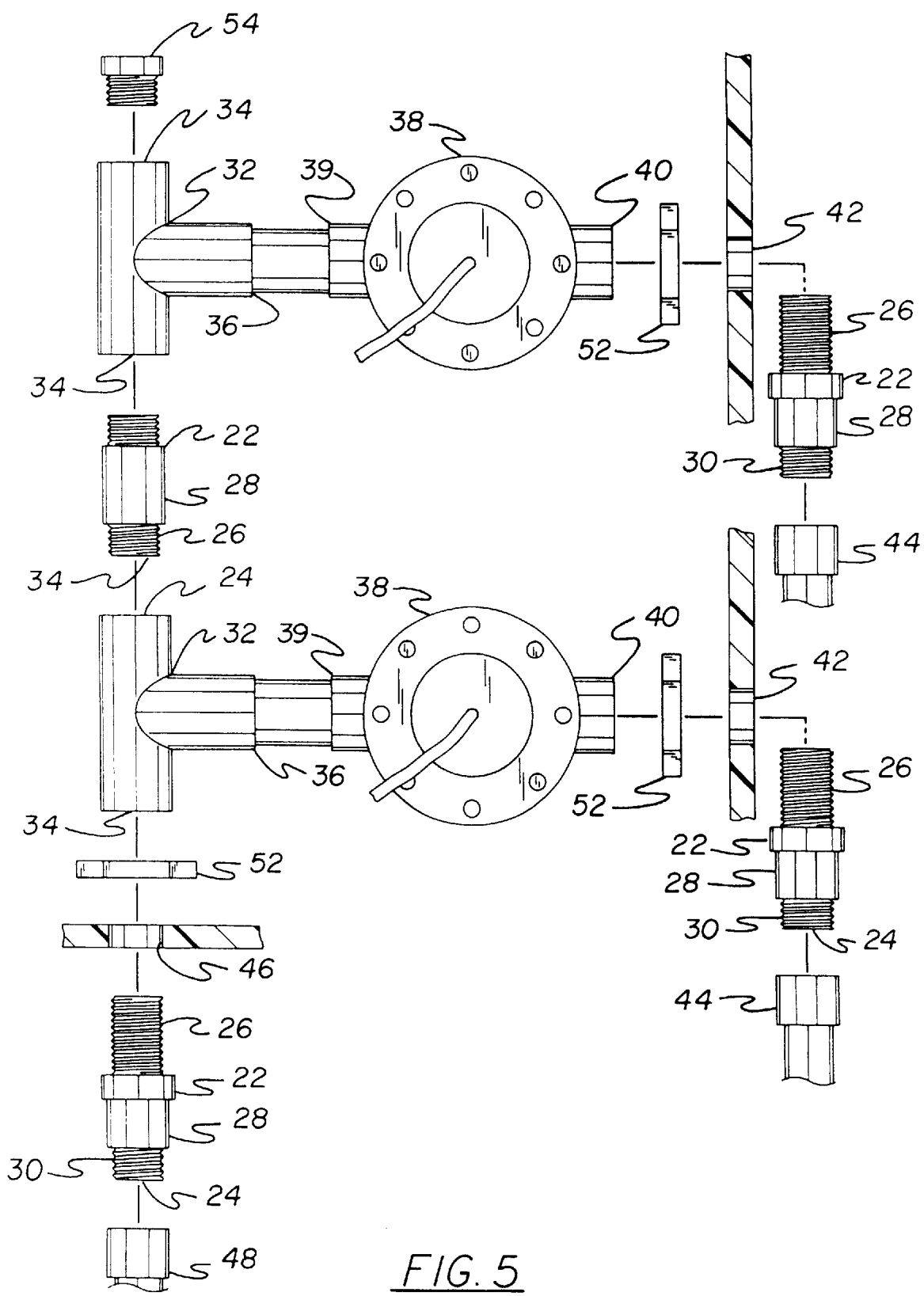
FIG. 5 is a front plan view of the male couples and interconnections of the present invention in a disassembled orientation.

With reference now to the drawings, and in particular to FIGS. 1 through 6 thereof, a new and improved portable control system for use with conventional sprinklers embodying the principles and concepts of the present invention and generally designated by the reference numeral 10 will be described.

The present invention, the new and improved portable control system for use with conventional sprinklers, is comprised of a plurality of components. Such components in their broadest context include a portable housing, multiple male couples, interconnections, rain level detector, and control panel. Such components are individually configured and correlated with respect to each other so as to attain the desired objective.

More specifically, it will be noted that the system 10 of the present invention includes a portable housing 12 with a base 18 having a bottom end, open top end, front face, rear face, and pair of side faces defining an interior space. The housing ideally has a length of approximately 36 inches, a width of approximately 18 inches, and a depth of approximately 6 inches. The base further has a plurality of apertures 14 formed in the bottom end thereof for allowing the drainage of fluid. A lid 16 is hingably coupled to the base 18 and has a lower surface and an upper surface with a handle 19 coupled thereto. A plurality of fasteners 20 are positioned on the lid and base for securing the lid in a closed orientation.

For coupling purposes, a plurality of cylindrical male couples 22 are included. Each male couple comprises an axial bore 24 formed therein, threadedly lined outer surface 26, and intermediate section having a hexagonal cross-section 28. Each male couple also has a first end 30 adapted to releasably couple to a conventional garden hose.

Positioned within the housing is a plurality of interconnections 32. Each interconnection comprises a T-shaped conduit with a pair of open axially aligned ends 34 and an orthogonal end 36. The T-shaped conduits are each coupled at the orthogonal end thereof to a solenoidal valve 38 at a first end thereof. The solenoidal valves are adapted to allow the passage of fluid upon the receipt of an activation signal. The valves are further adapted to preclude the passage of fluid therethrough upon the absence of the activation signal. Each interconnection employs one of the male couples to align a second end 40 of the valve with one of a plurality of apertures 42 formed in the front face of the housing. Such male couple also allows coupling with an outflow hose 44. Additionally, a plurality of unused linearly aligned apertures are formed on the front face of the housing so as to allow the retrofitting of additional interconnections. One of the interconnections employs one of the male couples to align one of the axial ends of the T-shaped conduit thereof with an aperture 46 formed in the side face of the housing. Such interconnection also allows coupling with an inflow hose 48. It should be noted that an unillustrated conventional one-way check valve is connected between the inflow hose and the interconnections to prevent vibration of the pipes when shifting from one sprinkler to another, as will soon become apparent. The remaining interconnections are interconnected at the axial ends thereof using a plurality of male couples. The length of the T-shaped conduit being defined as the distance between the axial ends thereof is at least the length of the diameter of the associated valve. Additionally, a plurality of bushings 52 are included to prevent fluid from escaping the interconnections.

An end couple 54 is screwably coupled to an axial end of the interconnection furthest from the inflow hose in order to also preclude loss of fluid. It should be noted that the end couple 54 is critical in allowing the optional interconnection of additional interconnects thereby permitting the inclusion of more sprinklers. As shown in FIG. 1, also included is a plurality of perforated circular punch-outs for accommodating an outlet of any additional interconnects.

Also included is a rain level detector 56 attached to the upper surface of the lid. The rain level detector is adapted to measure the amount of rain and to transmit a deactivation signal upon the measuring of a designated amount. To accomplish such a purpose, a retention cup 58 is included with an electronic eye 60 positioned adjacent thereto. After the water level surpasses a predetermined level within the cup, the electronic eye transmits the activation signal. Alternatively the rain level detector may be situated distant from the lid in a location better suited for accepting rainfall.

Finally, a control box 62 comprising a control panel 64 is situated on the lower surface of the lid of the housing. A lid 66 is hingably coupled thereto for precluding water from penetrating therein. The panel is connected to the rain level detector and each solenoidal valve of the interconnections. During use, the panel employs a timer 68 to allow selective transmission of the activation signal to each solenoidal valve at a designated time. The timer of the panel may also be utilized to selectively adjust the duration of such transmission for each solenoidal valve. To prevent over watering of the lawn, the panel is further adapted to preclude the transmission of the activation signal upon the receipt of the deactivation signal from the rain level detector. The control panel allows adjustment of the rain level detector insofar as it determines at which level of received rain it transmits the deactivation signal. The control panel is thus adapted to allow the activation of different sprinklers at various times for different time lengths and further allows the independent deactivation of selected valves upon the receipt of a designated amount of rain. Lastly, an actuation switch 70 is included to manually actuate and deactivate the present invention. While a plug is shown in the Figures for providing power, it is preferred that in most applications, a battery be employed to maintain the portability of the present invention.

The present invention may be conveniently employed to operate any number of outflow hoses and associated sprinklers while requiring only one inflow hose. Such a sprinkler control system is ideal for realtors, business people, and the like whom require temporary portable control of a sprinkler system.

Figure 6:
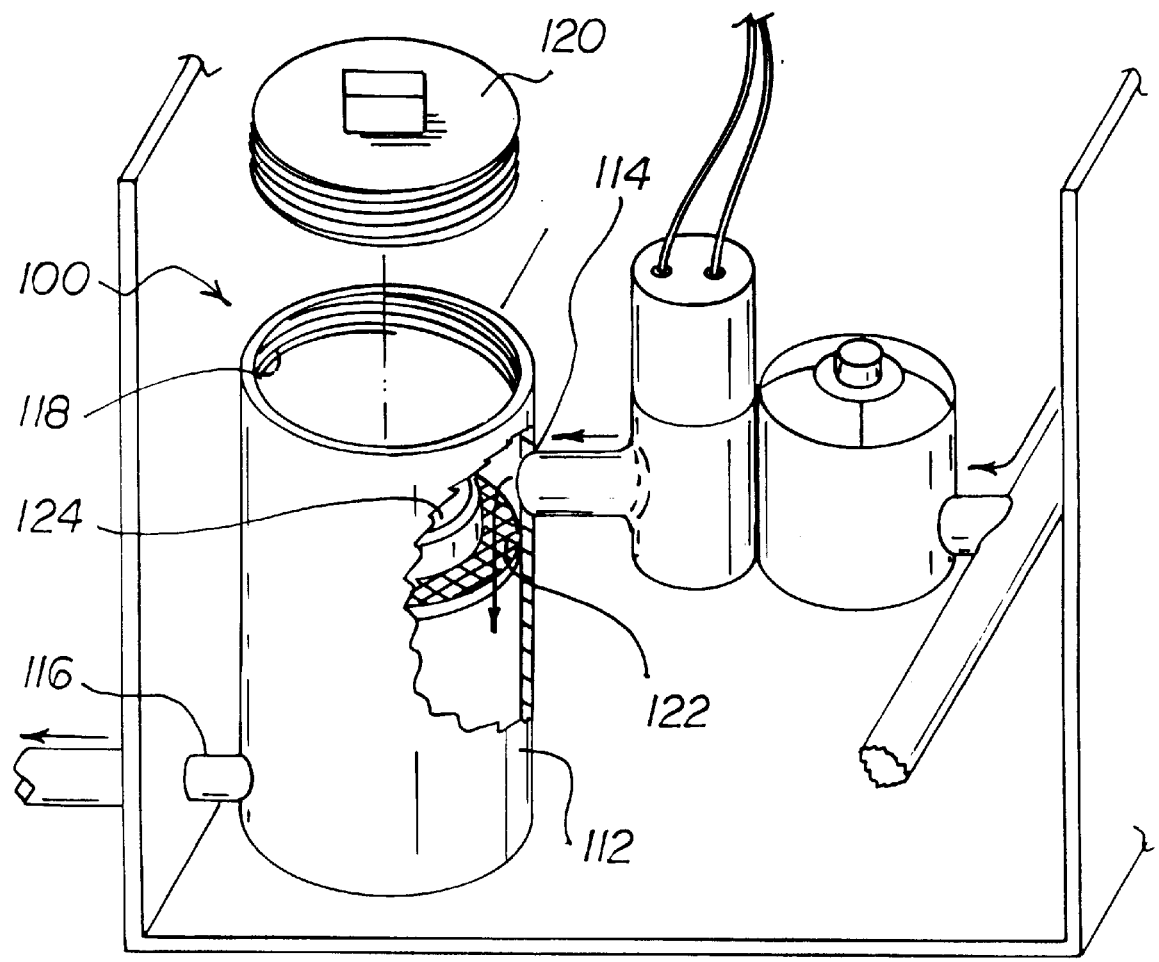
FIG. 6 is a perspective view of the fertilizer means of an alternate embodiment of the present invention.

As shown in FIG. 6, an alternate embodiment of the present invention includes a fertilizer means 100 connected to the interconnections for allowing the supply of fertilizer to the fluid passing between the garden inflow hose and the garden outflow hoses. The fertilizer mechanism includes a plurality of containers 112 each connected between the garden inflow hose and an associated one of the garden outflow hoses. This allows the supply of a unique predetermined amount and type of fertilizer to each of a plurality of discrete sprinklers.

Each of the containers of the fertilizer means of the present embodiment has a cylindrical configuration with a circular bottom face and a vertically oriented tubular periphery for defining an open top and an interior space. The tubular periphery has an inlet aperture 114 formed therein adjacent to the open top for connection with the solenoid. Associated therewith is an outlet aperture 116 formed in the container adjacent the bottom face and opposite the inlet aperture for coupling with the corresponding garden outflow hose.

The tubular periphery of the container further has a plurality of threads 118 formed in an inner surface thereof adjacent the open top. Such allows the removable coupling of a disk-shaped lid 120 having a plurality of threaded groves formed in a periphery thereof. Each container further has a horizontally oriented circular screen 122 removably mounted on a ledge at a central extent of the container just below the inlet aperture. A solid fertilizer 124 in the form of a tablet may be removably positioned on the screen and the lid secured in place. As such, upon the flow of water to the garden outflow tube associated with the container, dissolved fertilizer is dispersed. It should be noted that the fertilizer may comprise of any growth conducive substance, insect repellent or the like.

For precluding unauthorized access to the fertilizer means, the lid of the portable housing is equipped with an unillustrated locking means. Further, while not shown, the containers are situated in side-by-side relationship within the portable housing between the front face thereof and the associated solenoid.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable sprinkler control system for use with conventional sprinklers comprising:

a portable housing;

a coupling means for allowing the interconnection between a conventional garden inflow hose and a plurality of conventional garden outflow hoses;

a valve means connected to the coupling means adapted to allow the passage of fluid upon the activation thereof;

a control panel situated within the housing, the control panel connected to the valve means and adapted to allow selective actuation and deactivation of each valve means at a designated time;

wherein the coupling means comprises a plurality of cylindrical male couples each comprising an axial bore formed therein, a threadedly lined outer surface, and an intermediate section therebetween having a hexagonal cross-section, each male couple having a first end adapted to releasably couple to a conventional garden hose; and a plurality of interconnections each comprising a T-shaped conduit with a pair of open axially aligned ends and an orthogonal end, each interconnection employing one of the male couples to align the orthogonal end of the conduit with an aperture formed in the housing and further to allow coupling with an outflow hose, whereby one of the interconnections employs one of the male couples to align one of the axial ends of the T-shaped conduit thereof with an aperture formed in the housing and further to allow coupling with an inflow hose and whereby the axial ends of the remaining interconnections are interconnected using a plurality of male couples.

2. A portable sprinkler control system with fertilizing means for use with conventional sprinklers comprising:

a portable housing;

coupling means for allowing the interconnection between a conventional garden inflow hose and a plurality of conventional garden outflow hoses;

valve means connected to the coupling means adapted to allow the passage of fluid upon the activation thereof;

a control panel situated within the housing, the control panel connected to the valve means and adapted to allow selective actuation and deactivation of each valve means at a designated time, wherein the control panel is further adapted to allow selective adjustment of the duration of time between activation and deactivation of each valve means; and fertilizer means connected to the coupling means for allowing the supply of fertilizer to the fluid passing between the garden inflow hose and garden outflow hoses, the fertilizer means including a plurality of containers each connected between the garden inflow hose and an associated one of the garden outflow hoses, thereby allowing the supply of a predetermined amount and type of fertilizer to each of a plurality of discrete sprinklers, each of the containers of the fertilizer means having a cylindrical configuration with a circular bottom face and a vertically oriented tubular periphery for defining an open top and an interior space, the tubular periphery having an inlet aperture formed therein adjacent to the open top for connection with the valve means and outlet aperture formed therein adjacent the bottom face thereof for coupling with the corresponding garden outflow hose, the tubular periphery further having a plurality of threads formed in an inner surface thereof adjacent the open top for allowing the removable coupling of a disk-shaped lid having a plurality of threaded grooves formed in a periphery thereof, each container further including a ledge with a horizontally oriented circular screen mounted on the ledge at a central extent of the container just below the inlet aperture, whereby a solid fertilizer may be removably positioned on the screen and the lid secured in place such that upon the flow of water to the garden outflow tube associated with the container, dissolved fertilizer is dispersed.

* * * * *